US006947096B2

(12) United States Patent
Kumazawa

(10) Patent No.: US 6,947,096 B2
(45) Date of Patent: Sep. 20, 2005

(54) VIDEO PROCESSING APPARATUS FOR CONVERTING COMPOSITE VIDEO SIGNALS TO DIGITAL COMPONENT VIDEO SIGNALS

(75) Inventor: Naoki Kumazawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 539 days.

(21) Appl. No.: 10/185,438

(22) Filed: Jun. 26, 2002

(65) Prior Publication Data

US 2003/0007101 A1 Jan. 9, 2003

(30) Foreign Application Priority Data

Jun. 28, 2001 (JP) ..................................... P2001-197246

(51) Int. Cl.⁷ .......................... H04N 11/06; H04N 5/455
(52) U.S. Cl. ...................... 348/488; 348/572; 348/638; 348/727
(58) Field of Search ................................ 348/572, 488, 348/491–493, 638–641, 727, 502, 539; 386/16, 20, 40, 44

(56) References Cited

U.S. PATENT DOCUMENTS

| | | | |
|---|---|---|---|
| 4,870,661 A | | 9/1989 | Yamada et al. |
| 5,268,750 A | * | 12/1993 | Stec et al. ................... 348/453 |
| 5,331,346 A | * | 7/1994 | Shields et al. .............. 348/441 |
| 5,349,381 A | * | 9/1994 | Murayama et al. ......... 348/252 |
| 5,521,637 A | * | 5/1996 | Asaida et al. ............ 348/222.1 |
| 5,585,794 A | * | 12/1996 | Airoldi et al. ................ 341/61 |
| 5,610,942 A | * | 3/1997 | Chen et al. .................. 375/242 |
| 6,724,430 B2 | * | 4/2004 | Miyoshi et al. ............. 348/441 |

FOREIGN PATENT DOCUMENTS

| | | |
|---|---|---|
| EP | 0 644 700 | 3/1995 |
| EP | 0 690 631 | 1/1996 |

* cited by examiner

*Primary Examiner*—Victor R. Kostak
(74) *Attorney, Agent, or Firm*—Frommer Lawrence & Haug LLP; William S. Frommer; Darren M. Simon

(57) ABSTRACT

A chroma-decoder 1 has two SRCs 17 and 21. The first SRC 17 performs down-conversion, changing the sampling rate of a composite video signal sampled with a system clock signal Cs to the sampling rate (14.3 MHz) of an NTSC signal. The signal generated by the SRC 17 is output in synchronism with the system clock signal Cs. The signal is then divided into a luminance signal Y and a color-difference signal C, which are subjected to chroma decoding. The second SRC 21 performs down-conversion, changing the sampling rate of the luminance signal and color-difference signal of the NTSC signal to the sampling rate (13.5 MHz) of an ITU-R601 standard.

9 Claims, 6 Drawing Sheets

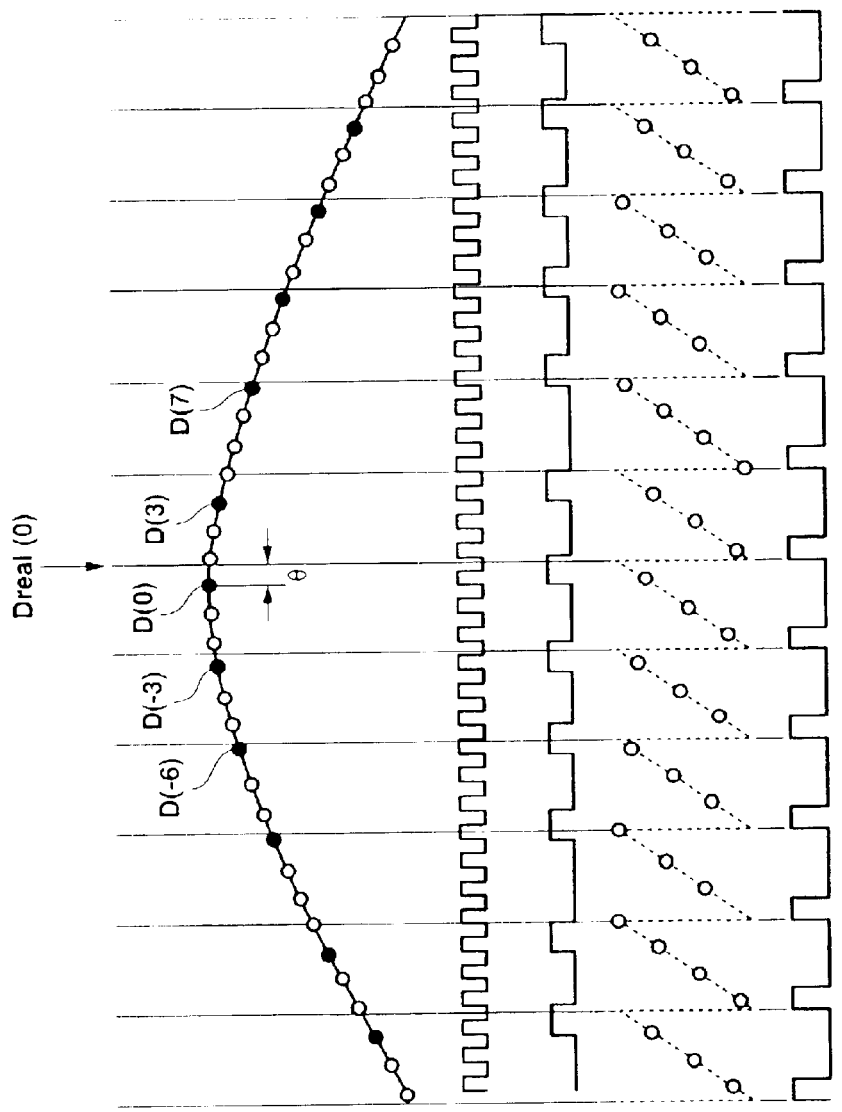

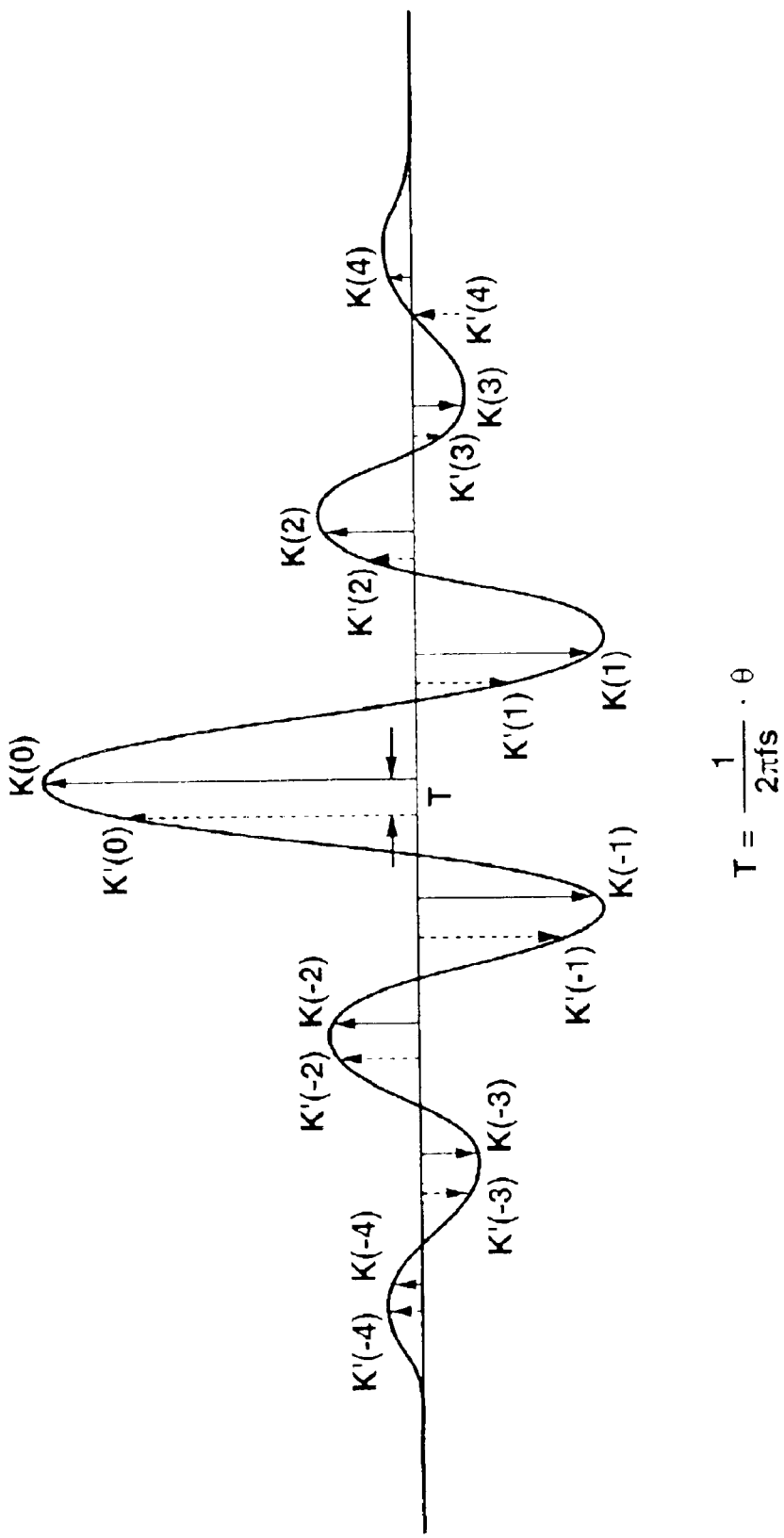

VIDEO PROCESSING APPARATUS FOR CONVERTING COMPOSITE VIDEO SIGNALS TO DIGITAL COMPONENT VIDEO SIGNALS

BACKGROUND OF THE INVENTION

1. Field of the Invention

The present invention relates to a video signal that performs so-called "chroma-decoding," thereby to convert composite video signals to digital component signals. More particularly, the invention relates to a video signal processing apparatus that can be used in various broadcasting systems such as NTSC system, PAL system, SECAM system and the like.

2. Description of the Related Art

To output a video signal after receipt of a composite video signal broadcast, the composite video signal is chroma-decoded. More precisely, the composite video signal is decomposed into a luminance signal (Y) and color-difference signals (Cb, Cr). The luminance signal and the color-difference signals constitute a component video signal. The chroma decoding is followed by matrix conversion that converts the component video signal to an RGB signal. The RGB signal is subjected to MPEG encoding. In recent years, a digital circuit performs so-called digital chroma decoding, in which composite video signals are processed, generating component video signals of a digital format.

TV broadcasting systems are broadly classified into three categories. The first category is NTSC system that is employed in Japan, North America, etc. The second is PAL system that is used in Europe, except France, and in South America. The third is SECAM system that is employed in France, Russia, etc.

A digital chroma-decoder of multi type that can be used in various broadcasting systems may be manufactured. In order to manufacture such a digital chroma-decoder, sampling blocks that sample signals of different frequencies, respectively, must be mounted on the substrate. This is because the carrier-wave frequency and modulation scheme of color-difference signals differ from one TV broadcasting system to another. In addition, the digital chroma-decoder of multi type needs to have at least four types of system blocks since the sampling frequency is 13.5 MHz, as defined by the ITU-R601 standard, to generate digital component signals.

If a plurality of system clocks are mounted on one substrate or one semiconductor chip, however, the system clocks interfere with one another, generating interference signals. The interference signals enter, for example, the analog input of the A/D converter, inevitably resulting in beat-like noise on the screen. Hence, system clocks should not be mounted on the substrate or semiconductor chip. In view of this, it is very difficult to manufacture a multi-type, digital choroma-decoder on one substrate or one semiconductor chip.

BRIEF SUMMARY OF THE INVENTION

The present invention has been made in view of the foregoing. An object of the invention is to provide a video signal processing apparatus which performs so-called "choroma decoding" on video signals of various TV broadcasting systems and in which a plurality of system clocks can be mounted on the same substrate or a chip in spite of the fact that it processes the video signals of different TV broadcasting systems.

A video signal processing apparatus according to the invention is designed to convert a composite video signal to a digital component video signal. The apparatus comprises: first timing-signal generating means for extracting sampling points corresponding to the timing of a first virtual clock signal, from the sampling points in the composite video signal sampled with a system clock signal of a prescribed frequency, thereby to generate a first timing signal that is synchronous with the sampling points extracted; first interpolation means for interpolating signal levels at the sampling points in the first virtual clock signal, from the signal levels in the composite video signal sampled with the system clock signal, thereby to generate a composite video signal sampled with the first virtual clock signal, and for outputting the composite video signal sampled with the first virtual clock signal in synchronism with the first timing signal; Y/C dividing means for dividing the composite video signal sampled with the first virtual clock signal, into a luminance signal and a carrier color-difference signal, said luminance signal and said carrier color-difference signal having been sampled with the first virtual clock signal; chroma-decoding means for demodulating the carrier color-difference signal sampled with the first virtual clock signal, thereby to generate a color-difference signal sampled with the first virtual clock signal; second timing-signal generating means for extracting sampling points corresponding to a second virtual clock signal, from the sampling points in the first timing signal, thereby to generate a second timing signal that is synchronous with the sampling points extracted; second interpolation means for interpolating signal levels at the sampling points in the second virtual clock signal, from the signal levels in the luminance signal and the color-difference signal, both sampled with the first virtual clock signal, thereby to generate a luminance signal and a color-difference signal, both sampled with the second virtual clock signal, and for outputting the luminance signal and the color-difference signal, both sampled with the second virtual clock signal, in synchronism with the second timing signal; and frequency-changing means for changing the frequency of the first virtual clock signal in accordance with the type of the composite video signal input.

In the video signal processing apparatus, a timing signal is generated which is synchronous with a system clock having a given frequency, and a video signal sampled with the system clock signal is converted in terms of sampling rate and then output in synchronism with the timing signal. Hence, only one system clock signal can serve to decompose a video signal into components Y and C, to achieve chroma decoding, and to convert the frequency for adjusting the output-signal timing.

The timing signal is synchronous with a virtual clock signal when its cycle is averaged within a specific period. The signal generated by interpolation has the same frequency as the input signal (i.e., broadcast signal) or the output signal obtained by sampling the broadcast signal. Therefore, the input signal can be digitally processed without troubles, even if the timing signal is not completely synchronous with the virtual clock signal.

The various parameters applied in the step of generating a timing signal from the system clock signal are changed in accordance with the broadcasting system. The apparatus can therefore digitally process the signals of different broadcasting systems.

Furthermore, the tap coefficient applied to interpolation can be changed in accordance with the phase difference between the timing signal and the virtual clock signal. This makes it easy to effect the interpolation.

In the video signal processing apparatus according to this invention, a timing signal synchronous with a system clock signal having a given frequency is generated. The interpolation means interpolates a difference between the timing signal and the broadcast signal input or the system clock of the output signal, and the signal has a value obtained by sampling the broadcast signal or the output signal with the system clock signal. Hence, only one system clock signal can serve to decompose a video signal into components Y and C, to achieve chroma decoding, and to convert the frequency for adjusting the output-signal timing.

In the video signal processing apparatus of this invention, a plurality of system clocks can, therefore, be mounted on the same substrate or a chip in spite of the fact that the apparatus processes the video signals of different TV broadcasting systems.

BRIEF DESCRIPTION OF THE SEVERAL VIEWS OF THE DRAWING

FIGS. 5A to 5E are a timing chart illustrating signals used in the SRC; and

FIG. 6 is a waveform diagram representing the impulse response of a FIR filter.

DETAILED DESCRIPTION OF THE INVENTION

An embodiment of the present invention, or a chroma-decoder, will be described.

The chroma-decoder is an apparatus that decomposes a composite video signal into a luminance signal and a color-difference signal and generates, from the luminance signal and the color-difference signal, a video signal that has a sampling clock frequency of 13.5-MHz as is defined by the ITU-R601 standard. The composite video signal input to the chroma-decoder complies with any TV broadcasting systems such as NTSC system, PAL system and SECAM system.

Figure 1:
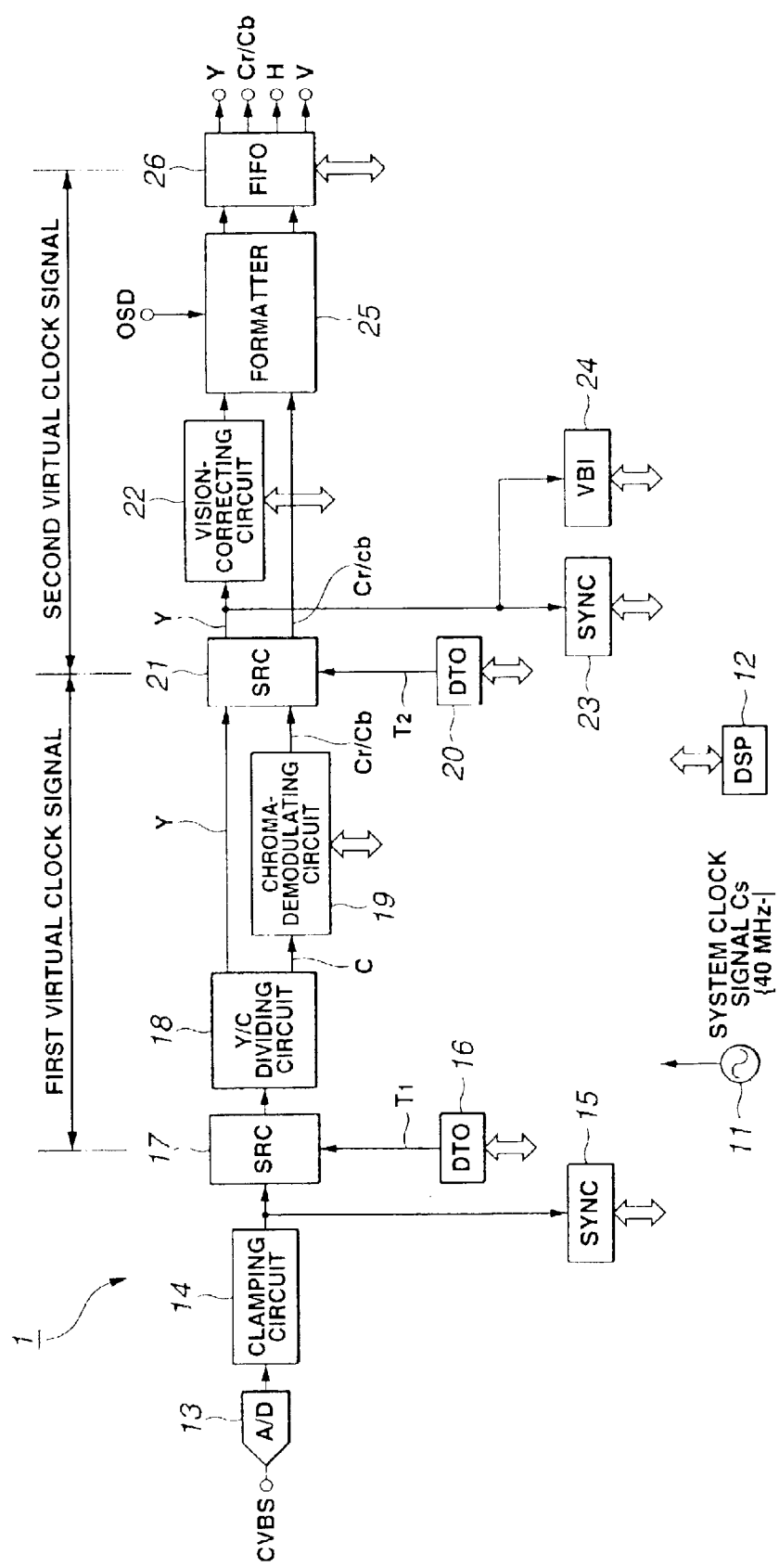
FIG. 1 is a block diagram of a chroma-decoder according to the present invention.

FIG. 1 is a block diagram of the chroma-decoder 1 according to the present invention.

As FIG. 1 shows, the chroma-decoder 1 comprises a system-clock oscillator 11, a digital signal processor (DSP) 12, an analog-to-digital (A/D) converter 13, a clamping circuit 14, a synchronous detector (SYNC circuit) 15, a first timing oscillator (DTO) 16, a first sampling-rate converter (SRC) 17, a luminance/chroma dividing circuit (Y/C) 18, a chroma-demodulating circuit 19, a second timing oscillator (DTO) 20, a second sampling-rate converter (SRC) 21, a vision-correcting circuit 22, a synchronous detector (SYNC circuit) 23, a VBI detecting circuit 24, a formatter 25, and a first-in/first-out memory (FIFO) 26.

The system-clock oscillator 11 generates a system clock signal Cs. The system clock signal is supplied to the other components of the chroma-decoder 1 and drives them. It is desired that the system clock signal Cs should have a frequency that is, at minimum, twice the four-fold (14.3 MHz) of the NTSC color carrier frequency fsc, twice the four-fold (17.8 MHz) of the PAL color carrier frequency fsc, or twice the four-fold (4.286 MHz×4=17.14 MHz) of the SECAM bell-filter center frequency fsc. More precisely, the frequency of the system clock signal Cs is 40 MHz in the present embodiment.

The DSP 12 controls the other circuits incorporated in the chroma-decoder 1.

The A/D converter 13 receives a composite video signal (CVBS), which is an analog signal supplied from an external apparatus. The A/D converter 13 samples the composite video signal by using the system clock signal Cs, converting the video signal into digital data.

The clamping circuit 14 receives the digital data from the A/D converter 13 and performs clamping on the digital data such that the pedestal level of the composite video signal may become constant.

The SYNC circuit 15 extracts a sync signal from the composite video signal output from clamping circuit 14, thus detecting a vertical synchronization timing and a horizontal synchronization timing. The SYNC circuit 15 generates pulses representing the synchronization timings. The pulses are supplied to the DSP 12.

The digital composite video signal generated by clamping the analog composite video signal is sampled by the system clock signal Cs and supplied to the first SRC 17.

Meanwhile, the first DTO 16 generates a first timing signal T1, which is supplied to the first SRC 17. The first timing signal T1 is synchronous with the system clock signal Cs. Its time cycle is the same as that of a first virtual clock signal Cv1, too, at an averaged pulse-generating period.

The first virtual clock signal Cv1 is a sampling clock signal that is necessarily used in the digital process of decomposing the composite video signal into a luminance signal and a color-difference signal and in the subsequence digital process of performing chroma demodulation. The first virtual clock signal Cv1 may have various frequencies, depending on the type of the video signal. If the video signal is an NTSC signal, the signal Cv1 has frequency of 14.3 MHz that is four times the color-carrier frequency fsc. If the video signal is a PAL signal, it has frequency of 17.8 MHz that is four times the color-carrier frequency fsc. If the video signal is an SECAM signal, it has frequency of 17.14 MHz that is four times the bell-filter center frequency.

In contrast to the first virtual clock signal Cv1, the first timing signal T1 is synchronous with the system clock signal Cs. The first virtual clock signal Cv1 has no specific relation with the system clock signal Cs in terms of frequency. Thus, the first virtual clock signal Cv1 is not synchronous with the first timing signal T1. This is why the first timing signal T1 is synchronous with the first virtual clock signal Cv1 at an averaged pulse-generating cycle. Although the first timing signal T1 is synchronous with the first virtual clock signal Cv1 if the sampling frequency is averaged for a long time, it has an unstable time cycle in view of the sampling intervals.

The DSP 12 determines the type of the composite video signal, sets the frequency of the first virtual clock signal Cv1 in accordance with the type of the composite video signal determined, and controls the first DTO 16. The first DTO 16 generates the first timing signal T1 on the basis of the frequency of the first virtual clock Cv1, which has been set by the DSP 12.

The frequency of the first virtual clock signal Cv1 may be a multiple of any one of the above-mentioned frequencies so long as the system clock signal Cs is sufficiently high. It is desired that the frequency of the first virtual clock signal Cv1 be equal to or less than half the frequency of the system clock signal Cs, in order to make the first SRC 17 convert the sampling rate at high accuracy.

The first SRC 17 interpolates the levels of the signals generated by sampling the composite video signal with the system clock signal Cs, thereby determining the levels of the signals that would be generated by sampling the analog composite video signal with the fist virtual clock signal Cv1. In other words, the first SRC 17 converts the sampling rate of the composite video signal, from the frequency of the system clock signal Cs to the frequency of the first virtual clock signal Cv1. To state it more briefly, the first SRC 17 carries out so-called "sampling rate conversion." The signals obtained by sampling the video signal at the rate thus converted are supplied from the first SRT 17 in synchronism with the first timing signal T1 generated by the first DTO 16.

Thus, the first SRC 17 outputs a composite video signal that is synchronous with the system clock signal Cs and has an unstable sampling cycle, though the data itself is signals sampled at the timing of the first virtual clock signal Cv1.

The composite video signal whose sampling rate has been changed to the frequency of the first virtual clock signal Cv1 is supplied to the Y/C dividing circuit 18.

The Y/C dividing circuit 18 divides the composite video signal that has been sampled with the first virtual clock signal Cv1, into a luminance signal Y and a carrier color-difference signal C (a color-difference signal modulated with a color carrier). The Y/C dividing circuit 18 can digitally process the composite video signal. This is because the composite video signal has been sampled at the rate that is the frequency of the first virtual clock signal Cv1. The luminance signal Y is supplied to the second SRC 21. The carrier color-difference signal C is supplied to the chroma-demodulating circuit 19.

The chroma-demodulating circuit 19 demodulates the carrier color-difference signal C sampled with the first virtual clock signal Cv1, extracting color-difference signals (Cr, Cb) from the signal. The demodulation mode depends upon the type of the composite video signal. The DSP 12 therefore selects the demodulation mode. The chroma-demodulating circuit 19 can digitally process the carrier color-difference signal C since the signal C has been sampled at a rate that is the frequency of the first virtual clock signal Cv1. The color-difference signals (Cr, Cb) obtained by demodulating the carrier color-difference signal C are supplied to the second SRC 21.

Data samples are input at irregular cycles to the Y/C dividing circuit 18 and the chroma-demodulating circuit 19. In spite of this, both circuits 18 and 19 can process the data samples reliably and correctly.

The second DTO 20 generates a second timing signal T2, which is supplied to the second SRC 21. The second timing signal T2 is synchronous with the first timing signal T1. Its time cycle is the same as that of a second virtual clock signal Cv2, too, at an averaged pulse-generating cycle.

The second virtual clock signal Cv2 is a clock signal of the component video signal the chroma-decoder 1 will output. That is, the second virtual clock signal Cv2 is a clock signal having frequency of 13.5 MHz that accords with the ITU-R601 standard.

In contrast to the second virtual clock signal Cv2, the second timing signal T2 is synchronous with the first timing signal T1, i.e., the system clock signal Cs. The second virtual clock signal Cv2 has no specific relation with the system clock signal Cs in terms of frequency. Thus, the second virtual clock signal Cv2 is not synchronous with the second timing signal T2. This is why the second timing signal T2 has the same cycle as the second virtual clock signal Cv2 at an averaged pulse-generating cycle. Although the second timing signal T2 is synchronous with the second virtual clock signal Cv2 if the sampling frequency is averaged for a longtime, its time cycle is unstable in view of the sampling intervals.

The second DTO 20 generates the second timing signal T2 on the basis of the frequency of the second virtual clock signal Cv2.

The second SRC 21 interpolates the levels of the signals generated by sampling the luminance signal Y and color-difference signal (Cr/Cb) with the first virtual clock signal Cv1, thereby determining the levels of the signals that would be generated by sampling the analog luminance signal Y and color-difference signal (Cr/Cb) with the second virtual clock signal Cv2. In other words, the second SRC 21 converts the sampling rate of the composite video signal, from the frequency of the first virtual clock signal Cv1 to the frequency of the second virtual clock signal Cv2. Namely, the second SRC 21 performs so-called "sampling rate conversion." The signals obtained by sampling the luminance signal Y and color-difference signals (Cr/Cb) at the rate thus converted are supplied from the second SRC 21 in synchronism with the second timing signal T2 generated by the second DTO 20.

As a result, the second SRC 21 outputs a composite video signal that is synchronous with the system clock signal Cs and has a unstable sampling cycle, though the data itself is signals sampled at the timing of the second virtual clock signal Cv2.

The luminance signal Y, the sampling rate of which has been converted to the frequency of the second virtual clock signal Cv2, is supplied to the vision-correcting circuit 22. The color-difference signal (Cr/Cb), the sampling rate of which has been converted to the frequency of the second virtual clock signal Cv2, is supplied to the formatter 25.

The vision-correcting circuit 22 performs gray-scale adjustment on the luminance signal Y input to it, thereby correcting the visual property of the luminance signal Y. The luminance signal Y, thus corrected in visual property, is supplied to the formatter 25.

The SYNC circuit 23 detects the vertical sync signal (V) and the horizontal sync signal (H) from the luminance signal Y. The vertical sync signal and the horizontal sync signal are supplied to the DSP 12.

The VBI detecting circuit 24 detects the VBI (Virtual Blanking Information) contained in the blanking-period component of the video signal. The VBI detected is supplied to the DSP 12.

The formatter 25 synthesizes the luminance signal Y and the color-difference signal (Cr/Cb), both input to it, with an OSD (On Screen Display) signal supplied from an external apparatus. The luminance signal Y and color-difference signal (Cr/Cb), output from the formatter 25, are supplied to the FIFO 26.

The FIFO 26 temporarily stores the luminance signal Y and the color-difference signal (Cr/Cb), both being synchronous with the second timing signal T2 but different in time cycle. The luminance signal and the color-difference signal are read from the FIFO 26 at the times defined by, for example, 13.5-MHz clock signal supplied from an external apparatus.

The first DTO 16 will be described in detail.

Figure 2:
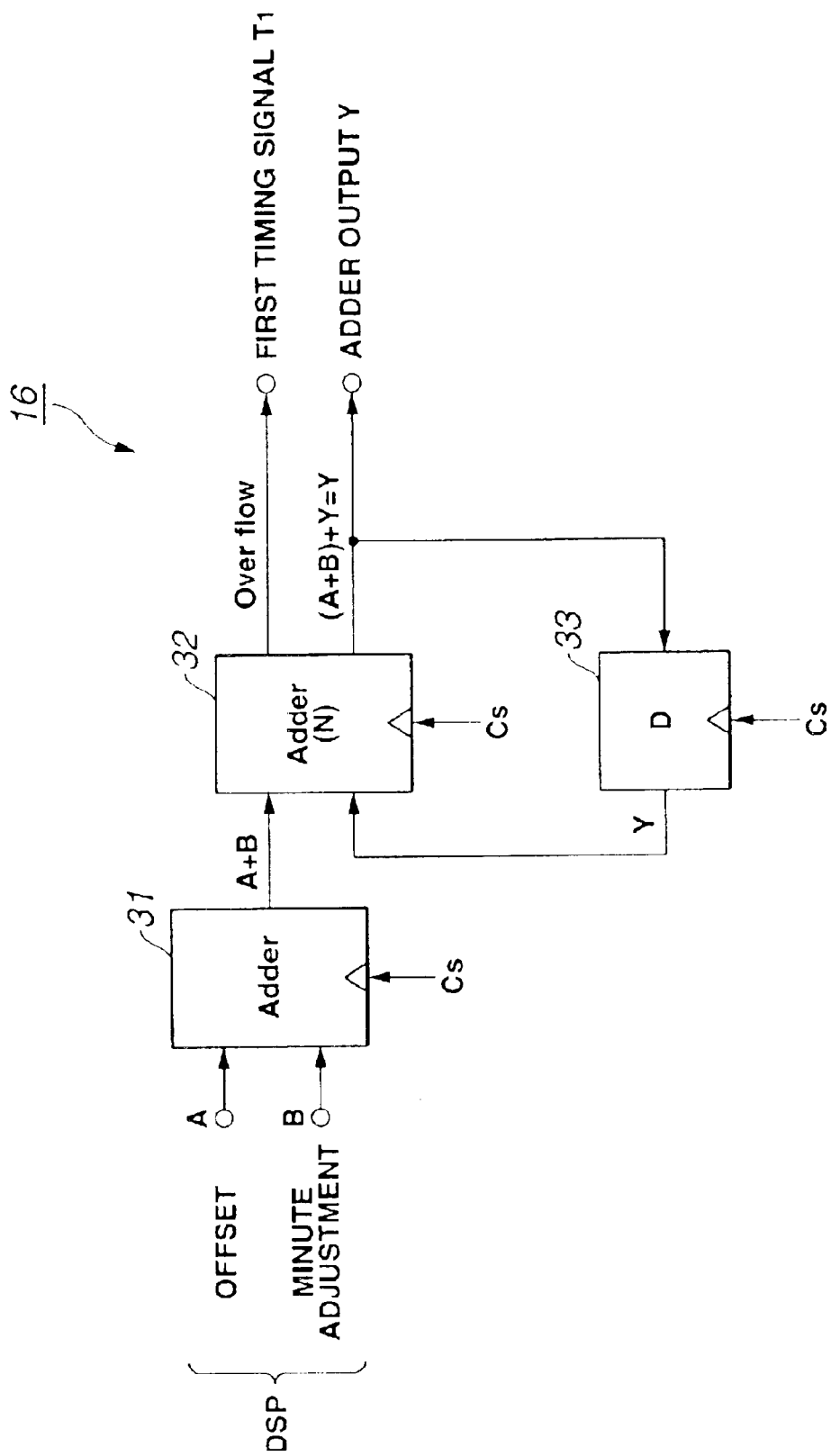
FIG. 2 is a circuit diagram of the DTO incorporated in the chroma-decoder.

FIG. 2 is a circuit diagram of the first DTO 16.

The DTO 16 comprises a first adder circuit 31, a second adder circuit 32, and a delay element 33. The components of the DTO 16 are driven by the system clock signal Cs.

The first adder circuit 31 receives an offset value A and a minute adjustment value B, both supplied from the DSP 12. The first adder circuit 31 adds the offset value A and the adjustment value B, generating a slope value (A+B).

The second adder circuit 32 receives the slope value (A+B) and the sample-sum value Y that is stored in the delay element 33 and pertains to the immediately preceding sample. The second adder circuit 32 adds the slope value (A+B) and the sum Y, outputting the present sample-sum value {(A+B)+Y}. The present sample-sum value {(A+B)+Y} is stored into the delay element 33. The value {(A+B)+Y} is fed back, as preceding sample-sum value Y, from the delay element 33 to the second adder circuit 32 at the next clock timing. Namely, the second adder circuit 32 and the delay element 33 cooperate to accumulate the slope values (A+B) for the samples. Hereinafter, the sum of these slope values shall be referred to as "adder output Y."

The output of the second adder circuit 32 is represented by N bits, or "$N^2$." Any output that has a greater value will overflow. If the output of the second adder circuit 32 exceeds $N^2$ inevitably overflows, the second adder circuit 32 will output the excessive part of the output, which is represented by a number of bits, not exceeding N. In other words, if the value {(A+B)+Y} surpasses $N^2$, the second adder circuit 32 will output {((A+B)+Y)−$N^2$}. Whenever its output overflows, the second adder circuit 32 generates an overflow flag.

Figure 3:
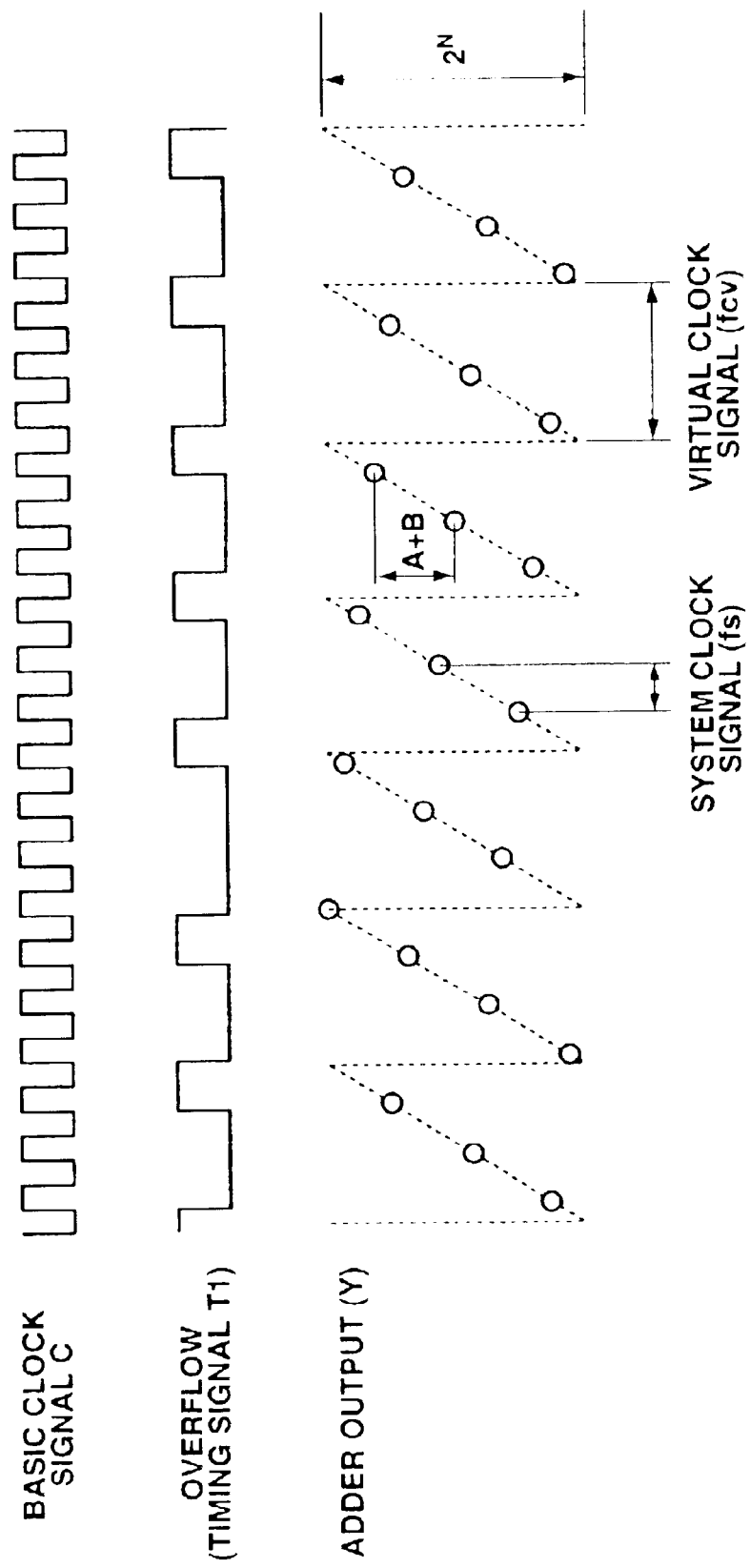
FIG. 3 is a timing chart showing a signal output from the DTO.

As FIG. 3 shows, the first DTO 16 outputs the overflow flag as the first timing signal T1.

To make the average cycle of the first timing signal T1 equal to the cycle of the first virtual clock signal Cv1, it is sufficient for the DSP 12 to set the slope value (A+B) as follows:

$$A+B=2^N \times (fv1/fs)$$

where fs is the frequency of the system clock signal Cs, and fv1 is the frequency of the first virtual clock signal Cv1.

Assume that the frequency of the system clock signal is 40 MHz and that the second adder circuit 32 generates an 8-bit output (N=8). Then, the slope value (A+B) is set as follows:

NTSC: $A+B=255*(14.3 \text{ MHz}/40 \text{ MHz})=91.16$

PAL: $A+B=255*(17.8 \text{ MHz}/40 \text{ MHz})=113.48$

SECAM: $A+B=255*(17.14 \text{ MHz}/40 \text{ MHz})=109.27$

Unless the slope value (A+B) is given as an integer, it cannot be digitally processed. Hence, the value set at the DSP 12 must be rounded off to the immediately smaller integer or the immediately greater integer. As the values set at the DSP 12 are so rounded off, however, the fractions will be added one to another, resulting in a frequency error.

To prevent such a frequency error, the DSP 12 outputs the integral part of the value as an offset value A and the fraction of the value as a minute adjustment value B, at each sampling time. Thus, the fractions would not be accumulated to make a frequency error.

The circuit configuration of the first DTO 16 has been described. The second DTO 20 is identical to the first DTO 16 in terms of circuit configuration.

In the second DTO 20, however, the components are driven not by the system clock signal Cs, but by the first timing signal T1. Further, the DSP 12 sets the slope value (A+B) as follows to order make the second timing signal T2 coincide with the cycle of the second virtual clock signal Cv2:

$$A+B=2^N \times (fv2/fv1)$$

where fv1 is the frequency of the first virtual clock signal Cv1, and fv2 is the frequency of the second virtual clock signal Cv2.

Assume that the frequency of the second virtual clock signal Cv2 is 13.5 MHz and that the second adder circuit 32 generates an 8-bit output (N=8). Then, the slope value (A+B) is set as follows:

NTSC: $A+B=255*(13.5 \text{ MHz}/14.3 \text{ MHz})=204.73$

PAL: $A+B=255*(13.5 \text{ MHz}/17.8 \text{ MHz})=193.40$

SECAM: $A+B=255*(13.5 \text{ MHz}/17.14 \text{ MHz})=200.85$

The first SRC 17 will be described in detail.

Figure 4:
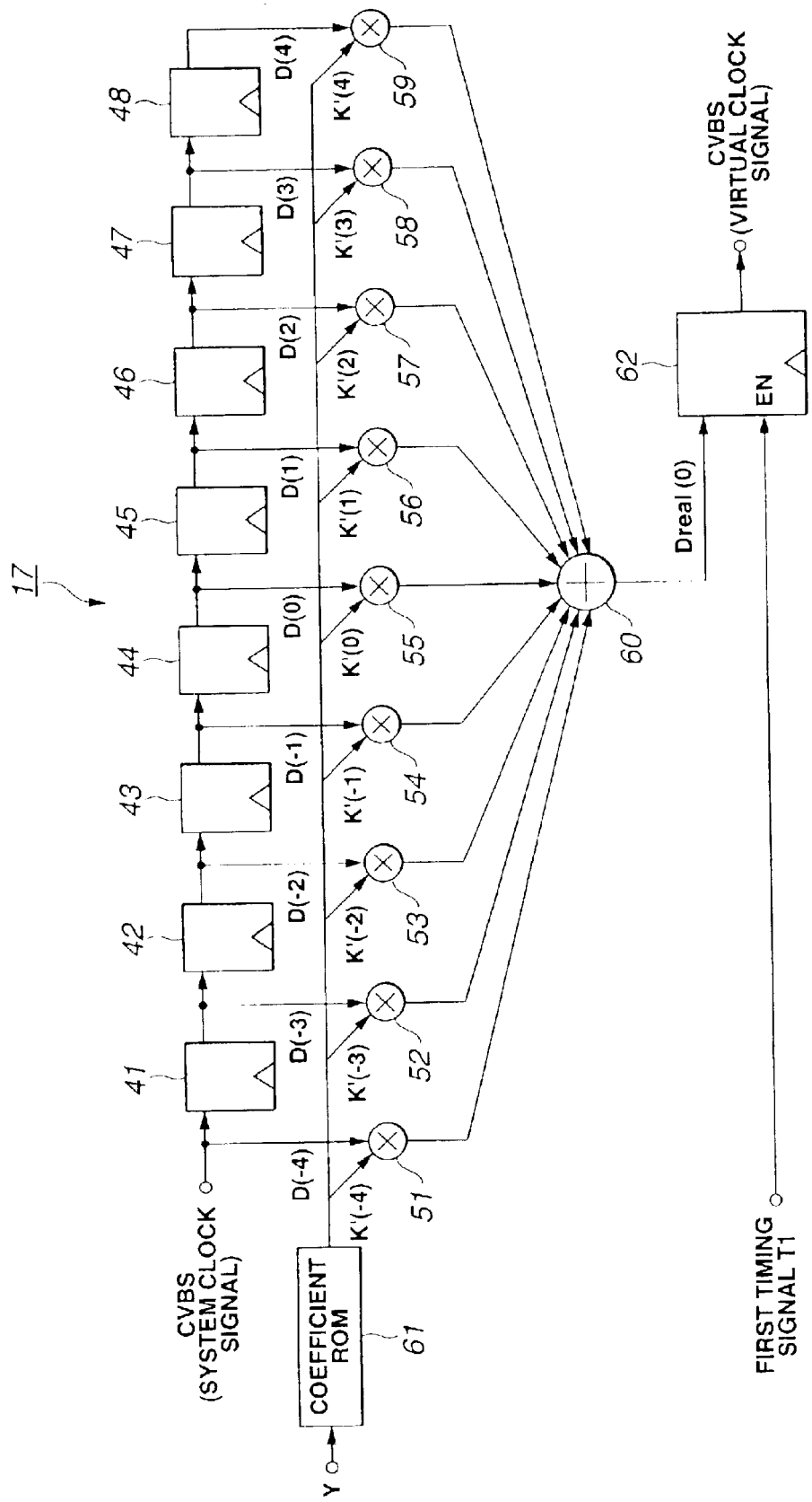
FIG. 4 is a circuit diagram of the SRC provided in the chorma-decoder.

The first SRC 17 may be such an interpolation filter that has a FIR filter, as is illustrated in FIG. 4. As FIG. 4 shows, the FIR filter has nine taps.

As FIG. 4 shows, the first SRC 17 comprises eight delay circuits 41 to 48, nine multipliers 51 to 59, and an adder 60. The components 41 to 48, 51 to 59 and 60 constitute the 9-tap FIR filter.

The first SRC 17 has a coefficient ROM 61 and a register 62. The ROM 61 stores tap coefficients to be supplied to the multipliers 51 to 59. The register 62 is provided to hold an output supplied from the adder 60 in synchronism with the first timing signal T1.

In the first SRC 17, the system clock signal Cs drives the delay elements. The register 62 stores only the interpolated value obtained in synchronism with the first timing signal T1 and outputs this value as a result of interpolation.

The first SRC 17 interpolates the levels of the signals generated by sampling the composite video signal with the first virtual clock signal Cv1, from the levels of the signals generated at the points at which the composite video signal has been sampled with the system clock signal Cs. Since the system clock signal Cs and the first virtual clock signal Cv1 differ in frequency, the phase difference between these clock signals Cs and Cv1 must be compensated in the course of interpolating the levels of the signals. Additionally, it is necessary to change the tap coefficient of the FIR filter every time the composite video signal is sampled, because the phase difference differs from a sampling point to another sampling point.

FIGS. 5A to 5E are a timing chart illustrating signals used in the first SRC 17.

FIG. 5A shows the composite video signal input to the first SRC 17. The black dots and white dots in FIG. 5A indicate the points at which the video signal is sampled with the system clock signal Cs. Of these dots, the black ones represent the sampling points that are synchronous with frequency of the first timing signal T1. FIG. 5B shows the system clock signal Cs. FIG. 5C depicts the first timing signal T1. FIG. 5D illustrates the adder output Y of the first DTO 16. FIG. 5E shows the first virtual clock signal Cv1.

Consider a sampling point D(0) on the system clock signal Cs. This point D(0) is synchronous with a specific pulse of the first timing signal T1. Assume that the FIR filter interpolate a signal Dreal(0) at a sampling point on the first virtual clock signal Cv1, which has a phase difference θ from the signal D(0) sampled at the point D(0) on the system clock signal Cs.

As shown in FIG. 5, the phase difference θ can be represented by the adder output Y generated when at the sampling point D(0), or when the first timing signal T1 is asserted. This is because the DSP 12 has set the slope value (A+B) that renders the time, which elapses while the adder output Y increases from 0 level to the overflow level, equal to the cycle of the first virtual clock signal Cv1.

As seen from FIG. 6, the phase difference θ corresponds to the delay T of the impulse response of the FIR filter.

Hence, the signal Dreal(0) generated at the specific sampling point on the first virtual clock signal Cv1 can be obtained as follows, from the basic tap coefficient that (K'(−4), K'(−3), K'(−2), K'(−1), K'(0), K'(1), K'(2), K'(3), K'(4)) is a product of the impulse response of the FIR filter and a prescribed delay-compensating time T:

$$Dreal(0) = K'(-4)*D(-4) + K'(-3)*D(-3) + K'(-2)*D(-2) +$$
$$K'(-1)*D(-1) + K'(0)*D(0) +$$
$$K'(1)*D(1) + K'(2)*D(2) + K'(3)*D(3) + K'(4)*D(4)$$

The phase difference θ and the tap coefficients associated with the phase difference θ may be stored into the ROM 61, and the tap coefficients may be read from the ROM 61 by using the adder output Y as an address and may be supplied to the multipliers 51 to 59. Then, the phase difference θ can be eliminated by means of interpolation.

The circuit configuration of the first SRC 17 has been described. The second SRC 21 is identical to the first SRC 17 in terms of circuit configuration.

In the second SRC 21, however, the components are driven not by the system clock signal Cs, but by the first timing signal T1. Therefore, the coefficients stored in the ROM 61 are different from those stored in the ROM 61 of the first SRC 17. Further, the register 62 holds the output of the adder 60 in synchronism with the second timing signal T2.

As indicated above, two timing signals T1 and T2, both synchronous with one system clock signal Cs, are generated in the chroma-decoder 1 according to the present invention. A video signal sampled with a given system clock signal Cs is sampled with two virtual clock signals Cv1 and Cv2, thus converted in terms of sampling rate. The resultant two signal steams are output in synchronism with two timing signals T1 and T2, respectively. Hence, only one system clock signal can serve to decompose a video signal into components Y and C, to achieve chroma decoding, and to convert the frequency for adjusting the output-signal timing.

In the chroma-decoder 1 of the present invention, a plurality of system clocks can be therefore mounted on the same substrate or a chip in spite of the fact that it processes the video signals of different TV broadcasting systems.

The composite video signal input to the chroma-decoder 1 described above is an analog signal. Nevertheless, a digital composite video signal can be input to the apparatus 1, along with the analog video signal. In this case, the chroma-decoder 1 must have a selector for selecting either the analog composite video signal or the digital composite video signal. To sample the digital composite vide signal, the sampling frequency is usually 14.3 MHz for NTSC system or 17.8 MHz for PAL system. Signals sampled at such frequencies may be temporarily stored in a memory and may then be read by using the system clock signal. The system clock signal needs to have a frequency much higher than the frequency at which the digital composite video signal is sampled. The data is continuously read from the memory by using the system clock signal, until the input sampling data input is updated. Since the first SRC 17 receives data sampled at frequencies such as 14.3 MHz and 17.8 MHz, it is not particularly necessary to perform interpolation. The number of taps in the FIR filter may only need to be 1 and the tap coefficient may only need to be 1, too.

Moreover, the chroma-decoder 1 may be modified to receive and process a luminance signal and a carrier color-difference signal, as well as composite video signals. If this is the case, the luminance signal and the carrier color-difference signal are not supplied to the luminance/chroma (Y/C) dividing circuit 18. Rather, they are supplied via a selector to the second SRC circuit 21 and the chroma-demodulating circuit 19, respectively.

What is claimed is:

1. A video signal processing apparatus for converting a composite video signal to a digital component video signal, said apparatus comprising:

first timing-signal generating means for extracting sampling points corresponding to the timing of a first virtual clock signal, from the sampling points in the composite video signal sampled with a system clock signal of a prescribed frequency, thereby to generate a first timing signal that is synchronous with the sampling points extracted;

first interpolation means for interpolating signal levels at the sampling points in the first virtual clock signal, from the signal levels in the composite video signal sampled with the system clock signal, thereby to generate a composite video signal sampled with the first virtual clock signal, and for outputting the composite video signal sampled with the first virtual clock signal in synchronism with the first timing signal;

Y/C dividing means for dividing the composite video signal sampled with the first virtual clock signal, into a luminance signal and a carrier color-difference signal, said luminance signal and said carrier color-difference signal having been sampled with the first virtual clock signal;

chroma-decoding means for demodulating the carrier color-difference signal sampled with the first virtual clock signal, thereby to generate a color-difference signal sampled with the first virtual clock signal;

second timing-signal generating means for extracting sampling points corresponding to a second virtual clock signal, from the sampling points in the first timing signal, thereby to generate a second timing signal that is synchronous with the sampling points extracted;

second interpolation means for interpolating signal levels at the sampling points in the second virtual clock signal, from the signal levels in the luminance signal and the color-difference signal, both sampled with the first virtual clock signal, thereby to generate a luminance signal and a color-difference signal, both sampled with the second virtual clock signal, and for outputting the luminance signal and the color-difference signal, both sampled with the second virtual clock signal, in synchronism with the second timing signal;

smoothing means for receiving the luminance signal and the color-difference signal, both sampled with the second virtual clock signal and input in synchronism with the second timing signal, and for outputting the luminance signal and the color-difference signal, by using an output clock signal which is synchronous with the second virtual clock signal; and frequency-changing means for changing the frequency of the first virtual clock signal in accordance with the type of the composite video signal input.

2. The video signal processing apparatus according to claim 1, further comprising analog-to-digital conversion means for converting an analog composite video signal to a digital composite video signal sampled with the system clock signal.

3. The video signal processing apparatus according to claim 1, wherein the system clock signal has a frequency higher than the frequency of the first virtual clock signal.

4. The video signal processing apparatus according to claim 1, wherein the frequency-changing means changes the frequency of the first virtual clock signal to four times the carrier color-difference signal when the composite video signal is either an NTSC-system signal or a PAL-system signal, and to a bell-filter center frequency when the composite video signal is a SECAM-system signal.

5. The video signal processing apparatus according to claim 1, wherein the second virtual clock signal has a frequency equal to the frequency of digital signals which are defined by the LTU-R601 standard.

6. The video signal processing apparatus according to claim 1, wherein the first interpolation means comprises an FIR filter having a prescribed number of taps and a tap coefficient which is controlled in accordance with a phase difference between the first virtual clock signal and the first timing signal.

7. The video signal processing apparatus according to claim 6, wherein the tap coefficient is set at a value corresponding to an impulse response which has been delayed in accordance with the phase difference.

8. The video signal processing apparatus according to claim 1, wherein the second interpolation means comprises an FIR filter having a prescribed number of taps and a tap coefficient which is controlled in accordance with a phase difference between the second virtual clock signal and the first virtual clock signal.

9. The video signal processing apparatus according to claim 8, wherein the tap coefficient is set at a value corresponding to an impulse response which has been delayed in accordance with the phase difference.

* * * * *